United States Patent [19]
Rovinsky

[11] Patent Number: 4,467,230
[45] Date of Patent: Aug. 21, 1984

[54] ALTERNATING CURRENT MOTOR SPEED CONTROL

[76] Inventor: Robert S. Rovinsky, 1 Nimitz Ct., Tonawanda, N.Y. 14150

[21] Appl. No.: 439,032

[22] Filed: Nov. 4, 1982

[51] Int. Cl.³ .......................................... H02K 7/10
[52] U.S. Cl. ..................... 310/83; 310/67 R; 310/266; 318/13
[58] Field of Search ...................... 310/83, 67 R, 266; 74/665 GB, 675, 679, 681, 686, 687; 318/13

[56] References Cited
U.S. PATENT DOCUMENTS

| | | | |
|---|---|---|---|
| 1,726,246 | 8/1929 | Stevens . | |
| 2,355,000 | 8/1944 | Liebrecht | 74/282 |
| 2,450,290 | 9/1948 | Maxwell | 310/67 R |
| 2,466,762 | 4/1949 | Campbell | 74/686 |
| 2,762,239 | 9/1956 | Van Dyke | 74/690 |
| 2,771,791 | 11/1956 | Bachman | 74/675 |
| 2,897,691 | 8/1959 | Lowe | 74/757 |
| 2,948,164 | 8/1960 | Neal | 74/705 |
| 3,013,452 | 12/1961 | Hornbostel . | |
| 3,119,282 | 1/1964 | Raze | 74/687 |
| 3,220,284 | 11/1965 | Horvath | 74/674 |
| 3,299,741 | 1/1967 | Twiford | 74/682 |
| 3,905,251 | 9/1975 | Greene | 74/687 |

FOREIGN PATENT DOCUMENTS 2719413 11/1977 Fed. Rep. of Germany ....... 310/83

Primary Examiner—J. D. Miller
Assistant Examiner—D. L. Rebsch
Attorney, Agent, or Firm—Christel, Bean & Linihan

[57] ABSTRACT

An alternating current speed control of the type associated with an alternating current motor whose output speed is essentially constant, the motor speed control being capable of varying the output speed of the motor from two times normal output to zero. The rotor of the electric motor is mounted on a cylindrical gear case which is in turn supported by the output shaft of a differential gearing mechanism disposed within the gear case. Controller means are provided to brake a regulating gear within the differential gear assembly to vary the output speed of the electric motor.

20 Claims, 3 Drawing Figures

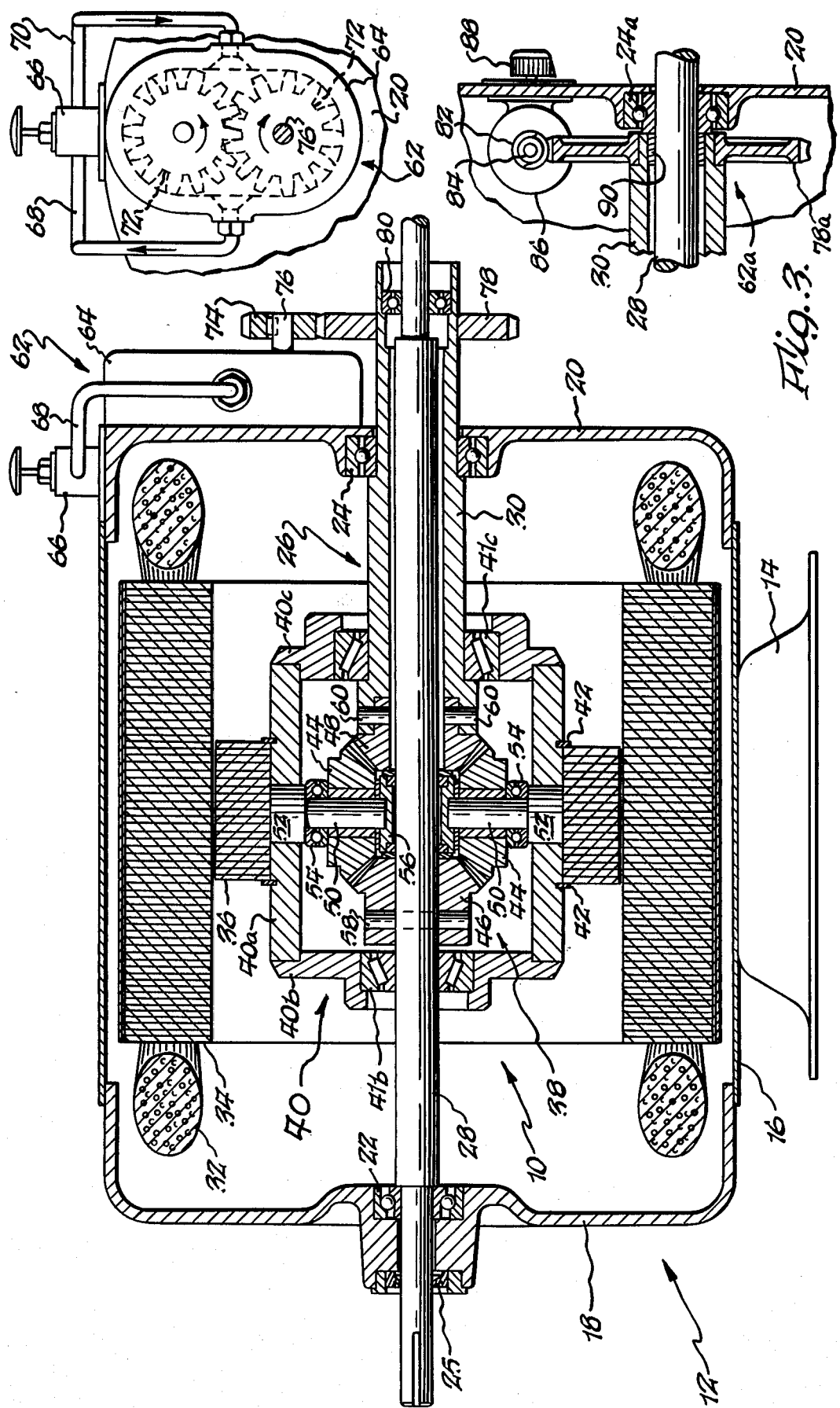

ALTERNATING CURRENT MOTOR SPEED CONTROL

FIELD OF THE INVENTION

The present invention relates generally to variable speed controls for electric motors, and more particularly to that type of speed control which can be associated with an electric motor whose normal output speed is essentially constant to vary that output speed from two times normal output down to zero.

BACKGROUND OF THE INVENTION

It is desirable that the output speed of an electric motor may be varied. For example, in large commercial refrigeration applications where three phase motors are used to drive compressors, there is a relatively constant output of the compressor if it is coupled directly to the motor, and this is not desirable if the demand decreases. In addition a compressor, which is directly coupled to the output shaft of a three phase motor, has a high starting torque (which adversely affects the life of the associated machinery) and also has a high initial power consumption during startup.

While variable speed electric motors are available, as a practical matter they are not available for the higher horsepower outputs required for commercial refrigeration installations.

In order to provide a variable output for a constant speed electric motor of the three phase type, the output shaft of the electric motor could be coupled to the variable speed transmission, such, as for example, a traction drive transmission, an impulse drive transmission or a controlled differential drive transmission. Examples of the latter form of transmission are shown in U.S. Pat. Nos. 2,762,239 and 2,897,691. The combination of a separate and variable speed transmission coupled to the output shaft of a constant speed motor has several disadvantages, such as large size and complexity. Also, such a unit would not be suitable for a hermetically sealed compressor unit.

OBJECTS AND SUMMARY OF THE INVENTION

It is a principal object of the present invention to provide a variable speed control for an electric motor of the type having a rotor driven at a constant speed, at least a portion of the control being mounted within and supporting the rotor whereby the size and complexity of the motor-transmission combination may be reduced.

It is a further object of the present invention to provide a speed control as set forth above wherein an electric output speed of the motor may be infinitely varied from two times normal output speed to zero.

Another object of the present invention is to provide an alternating current motor speed control which may be incorporated into a hermetically sealed compressor unit.

Another object of the present invention is to provide a speed control for an alternating current motor whereby the motor's output which is infinitely variable over a given range, which speed control can be retrofitted into existing electric motor housings.

Yet another object of the present invention is to provide a variable speed control for an electric motor as set forth above wherein the combination has soft start capabilities without power surges and torque spikes.

These and other objects and advantages of the present invention are accomplished by providing an electric motor having a rotor and a stator disposed within a motor housing with a variable speed mechanism. The mechanism is characterized by a shaft assembly which is journaled in opposed sides of the motor housing, the shaft assembly including an output shaft and a control shaft, and a gear assembly supported by the shaft assembly. The gear assembly includes a closed gear case having mounted therein epicyclic gearing of the type including pinion gears and first and second differential side gears. The first differential side gear is coupled to the output shaft, and the second differential side gear is coupled to the control shaft. The gear case provides the entire support for the electric motor rotor. Control means are interconnected with the control shaft and are capable of controlling the speed of the second differential side gear whereby the speed of the output shaft may be varied. The control means can be in the form of a gear pump driven from the control shaft, the gear pump in turn being associated with a variable orifice metering device by a closed loop fluid line system. Other forms of control can be used.

The above will become more apparent to those skilled in the art after a consideration of the following detailed description taken in conjunction with the accompanying drawings in which a preferred form of this invention is illustrated.

BRIEF DESCRIPTION OF THE DRAWINGS

FIG. 1 is a cross-sectional view through an electric motor and housing incorporating one embodiment of the motor speed control of this invention, the one embodiment having one form of controller mounted on the electric motor housing.

FIG. 2 is a side view of a portion of FIG. 1 showing additional details of the controller.

FIG. 3 is a fragmentary view of an electric motor and housing incorporating a motor speed control having an alternate form of control.

DETAILED DESCRIPTION

Referring first to the embodiment shown in FIGS. 1 and 2, the motor output speed control of this invention is indicated generally at 10, the control being mounted within an electric motor indicated generally at 12. The motor 12 is supported on a base 14, and includes a stationary motor housing having spaced apart opposed sides, 18, 20. The sides 18, 20 each in turn are provided with aligned apertures having bearings 22, 24 mounted therein. Shaft means, indicated generally at 26, are journaled within said bearings, the shaft means including a continuous output shaft 28, and a hollow control shaft 30, which shaft means will be discussed in greater detail below. Suitable seals, such as dust seal 25, may be provided as is well known in the art. As is conventional, the stationary motor housing 16 is provided with motor windings 32 and a stator 34, the motor windings being disposed about the interior of the housing in a known arrangement in order to provide a rotating field. A rotor 36 is mounted for rotation within the stator. As the motor speed control of this invention has particular application to motors of the type which have a relatively constant speed, such as three-phase electric motors, it can be assumed that the motor illustrated is of the type that will cause the rotor 36 to rotate at a relatively constant speed when current is applied to the motor.

Disposed within the rotor 36 is an epicyclic gear assembly indicated generally at 38. The gear assembly includes a closed gear case indicated generally at 40 on which the rotor 36 is mounted for rotation therewith. To this end, the gear case could be force fitted within a cylindrical bore within the rotor 36, the gear case being secured from lateral shifting movement by rings 42. The gear case could be secured in other manners, such as for example by welding. The gear case includes a generally cylindrical portion 40a and apertured end portions 40b, 40c which are secured to the portion 40a by cap screws or the like (not shown). Bearings 41b and 41c are disposed within the apertures of end portions 40b, 40c, respectively, and support the gear case 40 on the shafts 28 and 30, respectively. Mounted within the gear case 40 is differential gearing which includes pinion gears 44 which mesh with first and second differential side gears 46, 48 respectively. The pinion gears are rotatably mounted about radially outwardly extending pinion shafts 50. The radial outer ends of the pinion shafts 50 are enlarged as indicated at 52, and the enlarged portions 52 are suitably secured to the casing 40. Thrust bearings 54 are disposed between the shoulder of the enlarged end 52 of the pinion shaft 50 and the pinion gear 44 to restrict radial movement of the pinions during operation of the gearing. The inner ends of the pinion shafts 50 are suitably secured to a bearing block 56 journaled about an intermediate portion of the output shaft 28.

As is well known to those skilled in the art it is desirable that the gearing within the gear case be suitably lubricated. Oil may be sealed within the case 40, and to this end a suitable plug (not shown) may be provided for oil inspection and addition. Alternatively, a pressure lubrication system may be used.

It should be observed at this point that as the rotor 36 is caused to rotate about the output shaft 28 that the pinion shafts 50 and corresponding pinion gears 44 will also be caused to orbit about the axis of the motor. Because of the differential gearing arrangement if side gear 48 were held from rotation the other differential side gear 46 would be caused to rotate at twice the speed of the rotor 36. Alternatively, if the gear 48 were rotating at twice the speed of the rotor 36, the rotational speed of the gear 46 would drop to zero. If the speed of the gear 48 were somewhat less than twice the rotational speed of the rotor but more than zero, the rotational speed of the first differential side gear would be somewhat less than maximum, as the sum of the rotational speeds of the gears 46, 48 is twice the rotational speed of the rotor. It can thus be seen that by varying the speed of the second differential side gear 48 that the rotational speed of the first differential side gear 46 can be varied.

In accordance with the principles of operation of the differential gearing set forth above, the first differential side gear 46 is secured to the output shaft 28 by pin means 58, the first differential side gear acting as output gearing. Similarly, the second differential side gear 48 is secured to the control shaft 30 by pins 60. If the speed of the control shaft 30 were to be varied it should be obvious that gearing 48 would act as regulating gearing to control the output speed of shaft 28.

To this end, various forms of controller means may be utilized, and two such controller means are illustrated, one form being illustrated in FIGS. 1 and 2, and another form being illustrated in FIG. 3. The control means of the form illustrated in FIGS. 1 and 2 is indicated generally at 62. The principal operative elements of the controller means 62 includes a gear pump 64 and a variable metering or orifice device, such as needle valve 66. Each of the gear pump 64 and the variable metering valve 66 are provided with an inlet and an outlet. First and second fluid lines 68, 70 are provided, the first fluid line 68 extending from the outlet of the pump 64 to the inlet of the metering valve 66. Similarly, the second fluid line extends from the outlet of the metering valve 66 to the inlet of the gear pump 64. As is conventional, the gear pump is provided with a pair of meshing gears 72 and when they are caused to be rotated in the direction indicated by the arrows, fluid will be forced from the outlet of the gear pump through the metering valve and back to the inlet of the pump. While the gear pump could be driven directly from the control shaft 30, it is easier to provide the gear pump with an external gear 74 carried by a shaft 76 to which one of the internal gears 72 is secured, the external gear 74 in turn being caused to be driven by a control gear 78 secured to one end of the control shaft 30.

In operation, if the output shaft 28 is connected to a load, and if the rotor is caused to rotate by applying electric current to the motor, it should be obvious that the pinion gears 44 will be caused to be orbited about the output shaft 28. If a brake were applied to the control shaft 30 to restrict it from rotation, the output shaft 28 would be driven at twice the rated motor speed. Similarly, if the shaft 30 were not braked, and if it were entirely free of load, it would tend to rotate at twice the speed of the shaft 28 when the shaft 28 is loaded. The metering valve 66 can thus be used to apply a variable braking force on the control gear 78 and shaft 30. Thus, when the rotor 36 starts to rotate when the shaft 28 is under load, if the metering valve 66 is open fluid from within the gear pump will be transferred through line 68, through the metering valve 66, and back in line 70 to the pump. As the metering valve is closed, movement of the shaft 30 will be braked causing the gear 48 to regulate the output speed of shaft 28.

With the design shown in FIGS. 1 and 2 large loads can be started up by the output shaft 28 without excessive electrical surges. For example, if the output shaft 28 were connected to a large compressor, the compressor could be gradually brought up to speed by initially opening the metering valve, and then applying electric current to the motor which would cause the load to initially be transferred through the gear pump. If the orifice within the valve 66 is then gradually closed down, the speed of the output shaft 28 will gradually increase to its desired level. Additionally, it should be noted that when used with a compressor that the compressor can be run at less than its rated capacity without changing the drives from the output shaft to the compressor. Thus, for example if the compressor were capable of delivering X volume of air at Y pressure in a given period of time at normal operating speeds but only half of the volume were required, such a volume could be provided without venting the excess to atmosphere by simply driving the compressor at a reduced speed.

It should be apparent from inspection of the drawings that the rotor of the electric motor is entirely supported by the gearing assembly and shafts 28, 30. It is a feature of this invention to have the output shaft 28 continuous and extend outwardly of the sides of the housing 16 to provide a better support for the rotor 26. To this end, it should be noted that in the modification shown in FIGS. 1 and 2 the shaft 28 passes through the control shaft 30 and is journaled therein by bearing 80. An alternate construction is illustrated in FIG. 3, which will be discussed below.

An alternate form of controller means, indicated generally at 62a, is illustrated in FIG. 3, this form of controller means utilizing a worm 82 to control the rotational speed of a control gear 78a which is in the form of a worm gear. The worm 82 is mounted on the output shaft 84 of a variable speed electric motor 86 whose rotational speed can be controlled by a control knob 88. In this design the worm gear 78a and worm 82 act as an escapement mechanism and can be utilized to precisely control the output speed of the shaft 28.

As can be seen from an inspection of the figures, the control means 62 as well as the control means 62a can be mounted on the stationary motor housing 16 and can be either disposed within it, as shown in FIG. 3, or without, as shown in FIGS. 1 and 2.

While the control shaft 30 may extend to the outside of the stationary motor housing 16, as shown in FIGS. 1 and 2, it may also terminate within the housing 16 as shown in FIG. 3. To this end the output shaft 28 is supported directly by bearing 24a which in turn is carried by the side wall 20, and the control shaft 30 adjacent the wall 20 can be supported by a suitable bearing 90 disposed between the hollow shaft 30 and the output shaft 28.

The controllers 62 and 62a shown in the Figures both require manual adjustment. However, automatic control may be provided by a suitable control circuit having command signal generators and feedback loops.

While the invention has been described as having particular application to the commerical refrigeration industry, it should be appreciated that this invention will also have utility in other applications. Therefore, it should be understood that the foregoing description and illustrations are by way of example only, and that such modifications and changes as may suggest themselves to those skilled in the art are intended to fall within the scope of the present invention as limited only by the appended claims.

What is claimed is:

1. A motor speed control in combination with a motor having a rotor disposed entirely within a stationary motor housing, the rotor, during operation of the motor, being normally driven at a relatively constant speed; said control being characterized by a gear assembly disposed within said rotor, said gear assembly including input gearing rotatable with said rotor, output gearing, and regulating gearing operatively associated with said input and output gearing;

shaft means including an output shaft coupled to said output gearing, and a control shaft coupled to said regulating gearing, said shaft means supporting said gear assembly;

bearing means carried by said motor housing, the shaft means being journaled within said bearing means; and controller means interconnected with the control shaft and capable of controlling the speed of the regulating gearing whereby the speed of the output shaft may be varied.

2. The motor speed control as set forth in claim 1, in which said gear assembly further includes a gear case mounted within and rigidly secured to said rotor, the input, output, and regulating gearing all being disposed within said gear case.

3. The motor speed control as set forth in claim 2, in which said input gearing is pinion gears journaled about radially outwardly extending pinion shafts, the outer ends of which are secured to said gear case.

4. The motor speed control as set forth in claim 2, wherein the control shaft extends outwardly of said gear case, and wherein the controller means includes a control gear carried by the control shaft, and braking means engageable with the control gear to variably brake the rotational speed of the control gear.

5. The motor speed control as set forth in claim 1, in which the shaft means includes a continuous output shaft which extends to either side of the stationary motor housing.

6. The motor speed control as set forth in claim 5 wherein the control shaft is hollow and is disposed about said output shaft, the hollow control shaft being journaled within the stationary motor housing, and the output shaft being journaled within the hollow shaft.

7. The motor speed control as set forth in claim 1, wherein the gear assembly includes a gear case mounted within the rotor, the input, output and regulating gearing all being mounted wihtin the gear case, the input gearing being pinion gears, the output gearing being a first differential side gear, and the regulating gearing being a second differential side gear, the first and second differential side gears each meshing with the pinion gears, and the pinion gears being carried by radially outwardly extending pinion shafts, the outer ends of which are carried by the gear case.

8. The motor speed control as set forth in claim 1, wherein the controller means includes a worm gear mounted on the control shaft, a worm in engagement with said worm gear, and a variable speed electric motor the output of which is connected to said worm, said variable speed electric motor being mounted on said stationary motor housing.

9. The motor speed control as set forth in claim 1, wherein the controller means includes a gear pump driven by said control shaft, a variable metering valve, the gear pump and the metering valve each being provided with an inlet and an outlet, and first and second fluid lines, the first fluid line being connected to the outlet of said gear pump and to the inlet of the variable metering device, and the second fluid line extending from the outlet of the variable metering device to the inlet of the gear pump.

10. An electric motor speed control in combination with an electric motor having a rotor within a stator, the rotor during operation of the motor being normally driven at a relatively constant speed; said control being characterized by a gear assembly mounted within the rotor and including input gearing rotatable with said rotor, output gearing, and regulating gearing operatively associated with said input and output gearing;

shaft means including an output shaft coupled to said output gearing, and a control shaft coupled to said regulating gearing; and controller means interconnected with the control shaft and capable of controlling the speed of the regulating gearing whereby the speed of the output shaft may be varied.

11. The motor speed control as set forth in claim 10, in which said stator is disposed within a stationary motor housing, and the output shaft extends to both sides of said housing.

12. The motor speed control as set forth in claim 11, in which the gear assembly further includes a closed gear case mounted within said rotor for rotation therewith, and in which the input gearing are pinion gears, said pinion gears being journaled on pinion shafts which extend radially away from said output shaft, the outer ends of the pinion shafts being carried by said gear case, and the inner ends of said pinion shafts being supported by a bearing block journaled on the output shaft.

13. The motor speed control as set forth in claim 11, wherein the control shaft is hollow, the hollow control shaft being disposed about said output shaft and extending to one side of said gear assembly.

14. The motor speed control as set forth in claim 13, wherein the controller means includes a gear pump coupled to said hollow control shaft in driven relationship thereto, a variable metering valve, the gear pump and the metering valve each being provided with an inlet and an outlet, and first and second fluid lines, the first fluid line extending from the outlet of said gear pump to the inlet of said metering valve, and the second fluid line extending from the outlet of said metering valve to the inlet of said gear pump.

15. The motor speed control as set forth in claim 13, wherein said controller means further includes a worm gear carried by said hollow control shaft, a worm in engagement with said worm gear, a variable speed electric motor whose output is coupled to said worm, the variable speed electric motor being carried on said motor housing.

16. The motor speed control as set forth in claim 10, wherein the input gearing are pinion gears journaled about radially outwardly extending pinion shafts and the output gearing and regulating gearing are first and second differential side gears, respectively.

17. An alternating current motor speed control in combination with an alternating current electric motor having a rotor and stator disposed within a motor housing having spaced apart opposed sides, the rotor during operation of the motor being normally driven at a relatively constant speed; said control being characterized by shaft means rotatably journaled in the opposed sides of the motor housing, the shaft means including an output shaft and a control shaft, a gear assembly supported by the shaft means, the gear assembly including a closed gear case having mounted therein differential gearing of the type including pinion gears and first and second differential side gears each of which meshes with the pinion gears, the closed gear case providing the entire support for said rotor, and the first differential side gear being mounted on the output shaft for rotation therewith; and controller means interconnected with the control shaft, the control means being capable of controlling the speed of the second differential side gear whereby the speed of the output shaft may be varied.

18. The motor speed control as set forth in claim 17, wherein the pinion gears are carried by radially outwardly extending pinion shafts, the outer ends of which are carried by the closed gear case, and the inner ends of which are carried by a bearing block journaled about the output shaft.

19. The motor speed control as set forth in claim 17, wherein the control shaft is hollow and extends to one side of the closed gear case, one end portion of the output shaft being journaled within the hollow control shaft.

20. The motor speed control as set forth in claim 19, wherein the controller means includes a control gear carried by the hollow control shaft, and braking means engageable with said control gear to variably brake the rotational speed of said control gear.

* * * * *